(12) United States Patent
Eckert

(10) Patent No.: US 6,357,839 B1
(45) Date of Patent: Mar. 19, 2002

(54) METHOD AND DEVICE FOR REGULATING THE LONGITUDINAL DYNAMICS OF A VEHICLE

(75) Inventor: Alfred Eckert, Mainz-Hechtsheim (DE)

(73) Assignee: Continential Teves AG & Co., Frankfurt (DE)

(*) Notice: Subject to any disclaimer, the term of this patent is extended or adjusted under 35 U.S.C. 154(b) by 0 days.

(21) Appl. No.: 09/367,062

(22) PCT Filed: Feb. 4, 1998

(86) PCT No.: PCT/EP98/00601

§ 371 Date: Oct. 29, 1999

§ 102(e) Date: Oct. 29, 1999

(87) PCT Pub. No.: WO98/34822

PCT Pub. Date: Aug. 13, 1998

(30) Foreign Application Priority Data

Feb. 8, 1997 (DE) .......................... 197 04 841

(51) Int. Cl.$^7$ ................................ B06T 8/56
(52) U.S. Cl. ......................................... 303/142
(58) Field of Search ................ 303/141, 142, 303/144, 145; 180/196

(56) References Cited

U.S. PATENT DOCUMENTS

| | | | | | |
|---|---|---|---|---|---|
| 4,947,332 A | * | 8/1990 | Ghoneim | ................ | 364/426.03 |
| 5,168,952 A | * | 12/1992 | Oono et al. | .................. | 180/197 |
| 5,184,527 A | * | 2/1993 | Nakamura | .................... | 74/866 |
| 5,379,222 A | * | 1/1995 | Anan et al. | ............. | 364/426.03 |
| 5,532,929 A | * | 7/1996 | Hattori et al. | ......... | 364/431.07 |
| 5,669,849 A | * | 9/1997 | Tabata et al. | ................ | 477/102 |
| 5,807,209 A | * | 9/1998 | Matsubara et al. | ......... | 477/176 |
| 5,850,616 A | * | 12/1998 | Matsuno et al. | ............... | 701/82 |
| 6,035,252 A | * | 3/2000 | Dixon et al. | ................ | 701/102 |
| 6,098,007 A | * | 8/2000 | Fritz | ........................... | 701/93 |
| 6,219,611 B1 | * | 4/2001 | Russell | ....................... | 701/105 |

FOREIGN PATENT DOCUMENTS

| | | |
|---|---|---|
| DE | 35 26 671 | 1/1987 |
| DE | 38 09 101 | 9/1989 |
| DE | 39 13 058 | 10/1990 |
| DE | 42 26 940 | 2/1994 |
| DE | 42 39 711 | 6/1994 |
| DE | 44 08 998 | 12/1994 |
| DE | 195 23 191 | 1/1996 |
| DE | 44 30 108 | 2/1996 |
| DE | 195 34 562 | 3/1996 |
| DE | 195 15 061 | 5/1996 |
| DE | 195 09 492 | 9/1996 |
| DE | 195 27 323 | 1/1997 |
| EP | 0 460 364 | 12/1991 |

* cited by examiner

Primary Examiner—Robert J Oberleitner
Assistant Examiner—Benjamin A Pezzlo

(57) ABSTRACT

The present invention describes a coordination device for nominal values for the brake and/or the engine. The arrangement is based on a system wherein various components contribute to controlling the longitudinal dynamics of a vehicle. According to the present invention, these components generate in parallel to each other intermediate nominal values for the brake and/or the engine. According to the intermediate nominal values prevailing, coordination devices generate engine or brake nominal values which are sent to the corresponding components.

15 Claims, 5 Drawing Sheets

METHOD AND DEVICE FOR REGULATING THE LONGITUDINAL DYNAMICS OF A VEHICLE

TECHNICAL FIELD

The present invention relates to vehicle control systems and more particularly relates to a method and a device for controlling the longitudinal dynamics of a vehicle.

BACKGROUND OF THE INVENTION

The present invention relates to the driving dynamics control systems of an automotive vehicle and, therefore, the disclosure of applicant's application No. 196 54 769.5 of Dec. 28, 1996 is included in its full contents because this application also refers to the longitudinal dynamics control of vehicles.

Modern processes and devices for controlling the longitudinal dynamics of a vehicle comprise an engine which is controlled by engine management or a corresponding device, a controlled brake, a controlled transmission as well as a complex vehicle dynamics control which predetermines nominal values for the brake, the transmission and the engine in response to the driver's demands and internal and external operating conditions of the vehicle.

Modern engine management often detects the nominal engine torque as an input quantity, and the brake can be supplied with the nominal brake pressure as an input quantity. These nominal values are generated by an ICC control (Intelligent Cruise Control) to which, in turn, the above-mentioned quantities are sent. Among these are the driver's speed demand, which is imparted to the vehicle via the accelerator pedal and brake pedal, various quantities sensed by sensors such as speed, longitudinal and transverse acceleration, distance from and relative speed with respect to a vehicle which drives ahead, etc. In longitudinal dynamics control operations, various components influence the nominal engine torque or the nominal brake pressure: On the one hand, the mentioned nominal values are determined according to a predetermined nominal acceleration (which, in turn, results from different components, for example, requirements indicated by the driver, cornering speed control, automatic cruise control, etc.). In addition, there is the traction slip control system TCS by which spinning of the wheels is prevented. TCS control operations reduce the torque requirements to be met by the engine. Engine stall torque control MSR prevents locking of the wheels when shifting down, for example, when shifting from the third into the second gear on a slippery road surface and with rear-wheel drive. Engine stall torque control increases the torque requirements. An automatic stability management system ASMS intervenes especially in the braking of the individual wheels, but can also take effect on the transmission and the engine. For example, individual wheels may be optionally braked with an ASMS control, also known as driving stability control system, in order to prevent a vehicle from skidding.

The above-mentioned components thus take effect on the determination of nominal values for the engine, transmission and/or brake. Up to now, however, no satisfying solution has been found regarding the joint processing of all influencing variables to produce nominal values.

An object of the present invention is to provide a process and a device for controlling the longitudinal dynamics of a vehicle wherein the specification of nominal values for the engine and/or the brake is achieved easily and in conformity with the individual driving situations.

DETAILED DESCRIPTION OF THE PREFERRED EMBODIMENT

Figure 1:
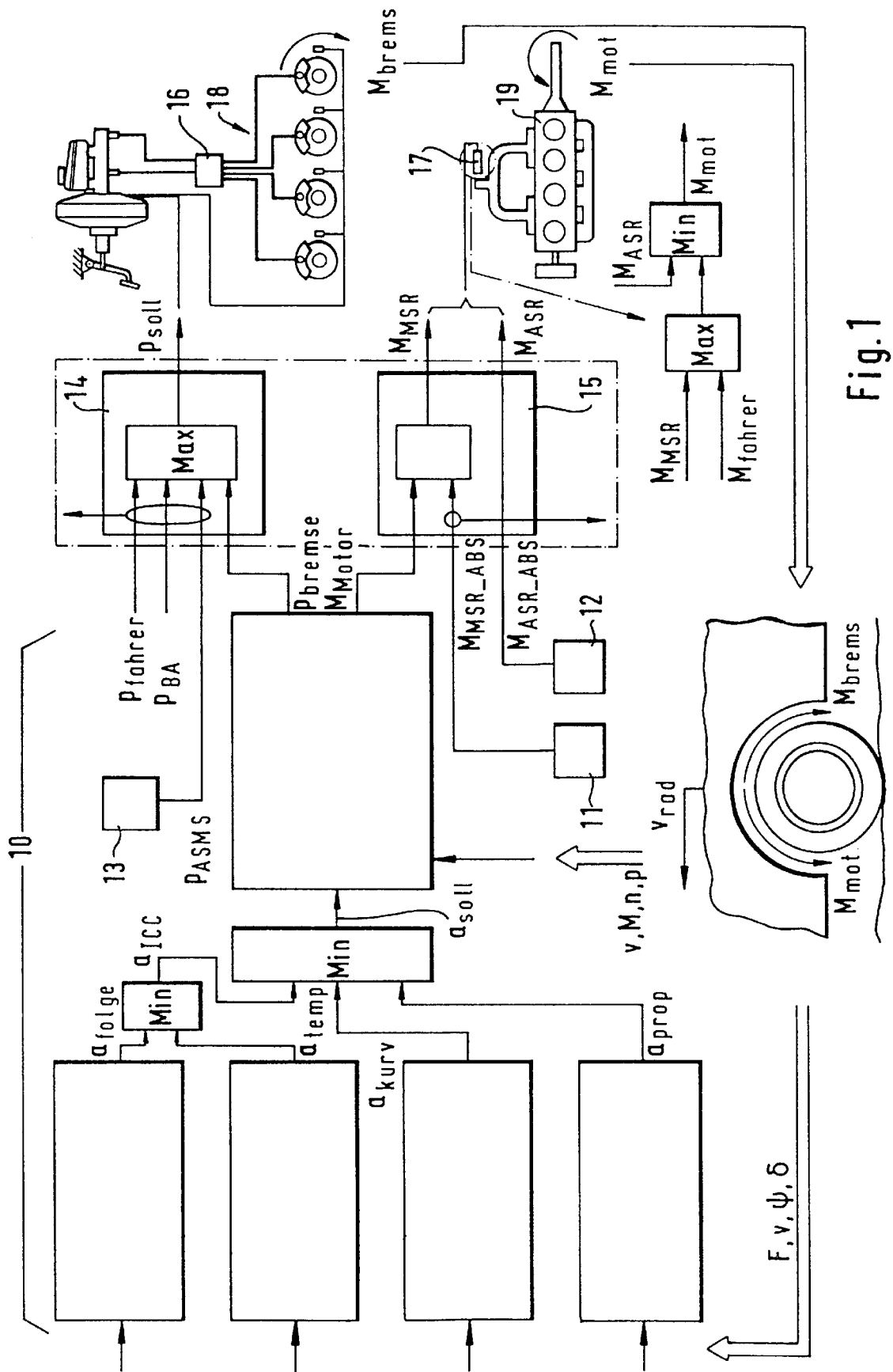
FIG. 1 is a first embodiment according to the present invention.

A first embodiment of the present invention is described with reference to FIG. 1. Reference numeral 19 designates the engine being controlled, and reference numeral 18 designates the brake system being controlled which is equipped with an ABS control system. Reference numeral 10 designates a device which produces nominal values for the engine and the brake from various quantities. The device 10 produces the nominal values under the assumption that the vehicle has a proper adherence to the road surface, i.e., that the wheels neither lock nor spin. The device 10 can be an ICC longitudinal dynamics control or a cruise control system (CC) (ICC='Intelligent Cruise Control'). Reference numeral 17 designates the engine control which controls the engine in accordance with nominal engine values. Reference numeral 16 designates the brake control which controls the brake system 18 in accordance with nominal brake values.

According to the present invention, various devices produce further appropriate nominal values for the engine or brake control, and from these nominal values, established functionally in parallel, the nominal values for the brake 18 and/or the engine 19 or its controllers 16 and 17 are determined in a suitable manner in a coordination device 15.

Initially, the production of a nominal brake value is described more precisely. The nominal value generated for the brake is the brake nominal pressure $p_{soll}$. Various devices produce functionally in parallel intermediate nominal values or intermediate nominal pressures. A first intermediate nominal pressure $p_{bremse}$ is generated by the device 10. Another intermediate nominal pressure $p_{ASMS}$ is generated by the driving stability control system. Another intermediate brake pressure $p_{BA}$ is generated by a brake assistant. Further intermediate nominal pressures can be determined in a suitable manner by other components. These intermediate nominal values or intermediate nominal pressures, which are determined functionally in parallel, are picked up by a coordination device 14, and the brake nominal value or brake nominal pressure $p_{soll}$ is determined from them in a suitable manner. One criterion for the coordination device 14 can be to select the maximum value from the intermediate nominal values or intermediate nominal pressures it picks up, and to send it as a brake nominal value or brake nominal pressure $p_{soll}$ to the brake system.

The generation of nominal engine values will be described in the following. It must be taken into consideration that modern motor control systems in which the so-called 'E-Gas'(=electronically controlled acceleration) concept (electronic accelerator pedal) is implemented, pick up two nominal engine torques, i.e. $M_{MSR}$ and $M_{ASR}$, preferably from the ABS control system. The nominal engine torque $M_{MSR}$ reflects results of the engine stall torque control, and the nominal engine torque $M_{ASR}$ reflects results from the engine traction slip control. These nominal engine values are determined from intermediate nominal values. An intermediate nominal value $M_{motor}$ is generated by the device 10. Another intermediate nominal value can be generated by the traction slip control 12, for example, in the form of an intermediate nominal torque. Another intermediate nominal value can be generated by the engine stall torque control 11 in the form of an intermediate nominal torque. These intermediate nominal values or intermediate nominal torques are introduced into a coordination device 15 which determines from them nominal engine values in a suitable fashion. The course of action in this case, too, is that different intermediate nominal values are determined functionally in parallel under different aspects, and nominal engine value(s) is/are determined from the parallel prevailing intermediate nominal values.

When the engine 19 picks up only one single nominal engine value or one signal nominal engine torque, the intermediate nominal values or intermediate nominal torques can be produced, for example, by a selection of maximum values.

FIG. 1 shows an embodiment which includes an intermediate nominal torque that is determined according to a nominal acceleration and each one intermediate nominal torque determined from the engine stall torque control 11 or the traction slip control 12. Also, an engine equipped with electronically controlled acceleration management is assumed. In this case, the maximum value is selected from the intermediate nominal torque $M_{motor}$ which is established according to the nominal acceleration in the device 10 and the intermediate nominal torque generated by the engine stall torque control 11, and is issued as a nominal engine torque $M_{MSR}$ to the engine. The intermediate nominal torque determined by the traction slip control 12 is issued as nominal engine torque $M_{ASR}$ to the engine.

The torque requirements requested by the driver of the vehicle can be processed in various ways: one possibility is to consider these torque requirements by the driver as another intermediate nominal torque or another intermediate nominal value and to introduce it into the coordination device 15 where it is processed in an appropriate manner. FIG. 1, however, shows an embodiment where the processing of the direct driver's wish does not take place in the coordinator 15 but in the engine electronic unit 17. Initially, the maximum value is determined therein from the driver's torque requirements $M_{fahrer}$ and the engine nominal torque $M_{MSR}$. Further, the minimum value is selected from this maximum value and the engine nominal torque $M_{ASR}$, and the so produced nominal torque $M_{mot}$ is used to control the engine.

The fact that the intermediate nominal values are determined in parallel when the nominal values for the brake and/or the engine are determined, they may be tested simultaneously and checked for defined relations between them. According to these checking operations, the nominal engine value may influence the nominal brake value and vice-versa, or reactions to the nominal acceleration being adjusted may be performed. For example, if the intermediate nominal torque $M_{motor}$ which originates from the ICC control or device 10 is smaller than the intermediate nominal torque generated by the engine stall control, a reaction to the nominal acceleration generated by the acceleration controller may be effected by an appropriate device.

In the embodiment shown, the coordination device 14 picks up, beside the intermediate nominal pressure $p_{bremse}$ from the ICC control 10, the intermediate nominal pressure $p_{ASMS}$ from the driving stability control system 13, an intermediate nominal pressure $p_{BA}$ from a brake assistant, and the intermediate nominal pressure according to the driver's wish $p_{fahrer}$ for determining the nominal brake value. When any one of the values $p_{ASMS}$, $p_{BA}$ or $p_{fahrer}$ prevails in the maximum value generation, shown as an example, this may e.g. cause deactivation of the ICC function or the ICC controller 10.

FIG. 1 shows a coordination device 14 for the nominal brake pressure and a coordination device 15 for the nominal engine torque(s). These coordination devices 14 and 15 can be provided individually or in combination.

Figure 2:
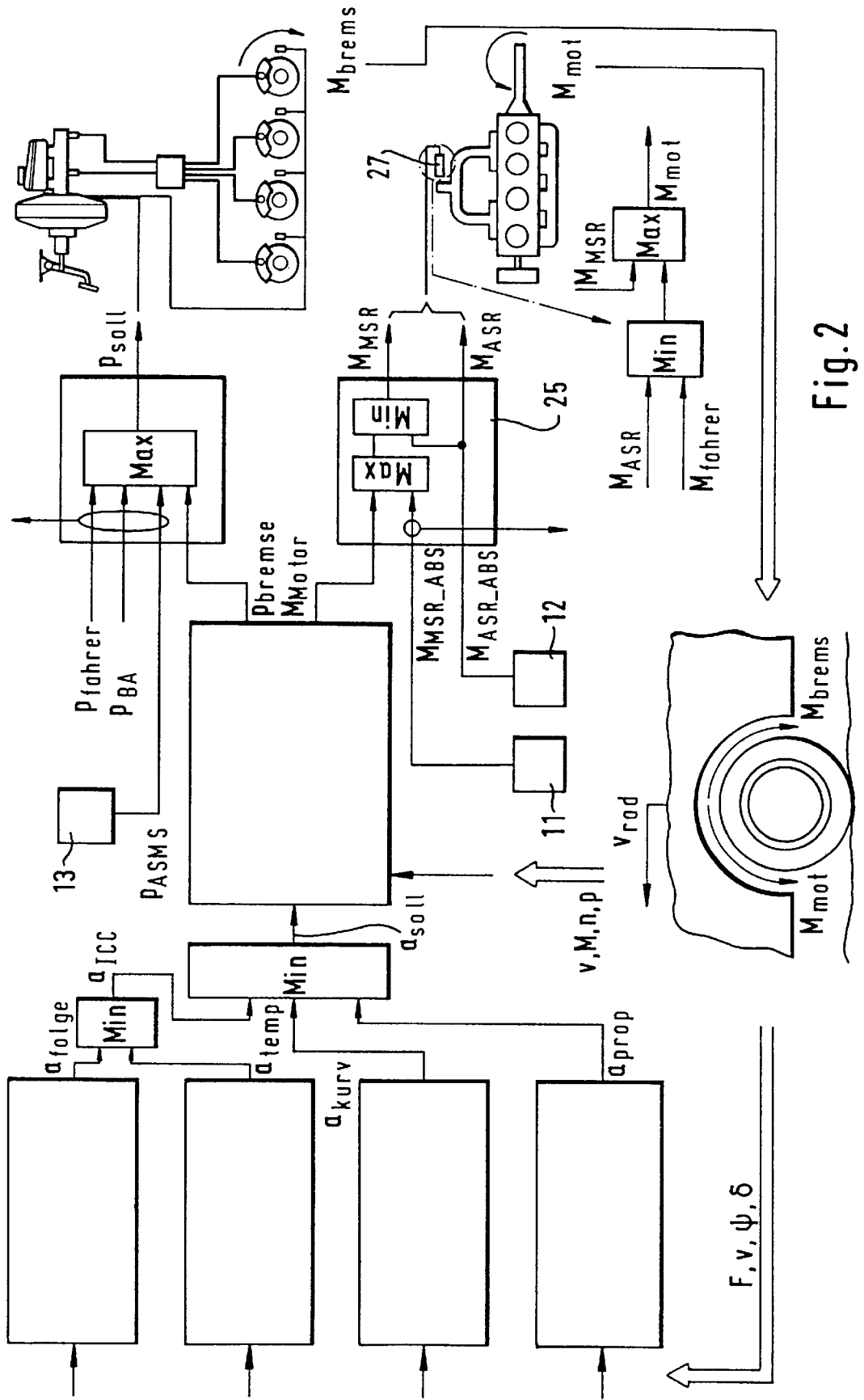
FIG. 2 is a second embodiment according to the present invention.

At reference numeral 25, FIG. 2 shows a variation of the coordination device 15 of FIG. 1. Exactly as the coordination device 15 of FIG. 1, device 25 picks up intermediate nominal torques from ICC control 10, traction slip control 12, and engine stall torque control 11. The coordination device 25 cooperates, however, with an engine management in which the inputs of the nominal values are processed as is shown in FIG. 2. The maximum value is then determined in the coordination device 25 from the intermediate nominal torque of the ICC control 10 and the intermediate nominal torque of the engine stall torque control 11. The minimum is determined from the so established value and the intermediate nominal torque of the traction slip control, and the so determined value is sent to the engine management as nominal engine torque $M_{MSR}$. The nominal engine torques $M_{MSR}$ and $M_{ASR}$ are processed in the engine electronic unit 27 so that, initially, the minimum value is selected in the engine electronic unit 27 from the nominal engine torque $M_{ASR}$ and the driver's requirements $M_{fahrer}$, and the maximum value is selected from this minimum value and the nominal engine torque $M_{MSR}$, and this maximum value is then used as an engine torque $M_{mot}$ to control the motor.

Figure 3:
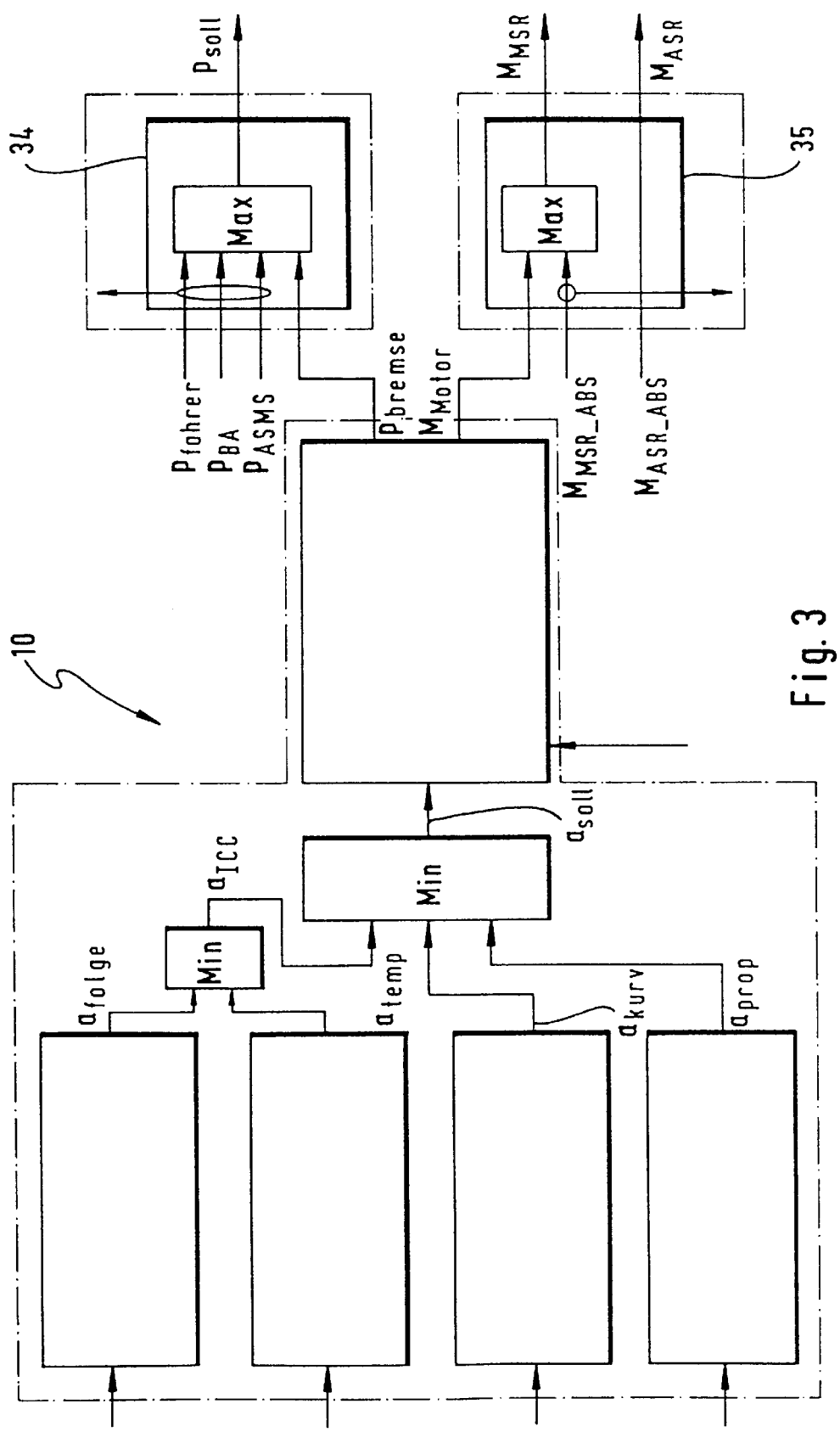
FIGS. 3 to 5 are views of individual assignments of the coordinator, or the coordination function, to different systems.
Figure 4:
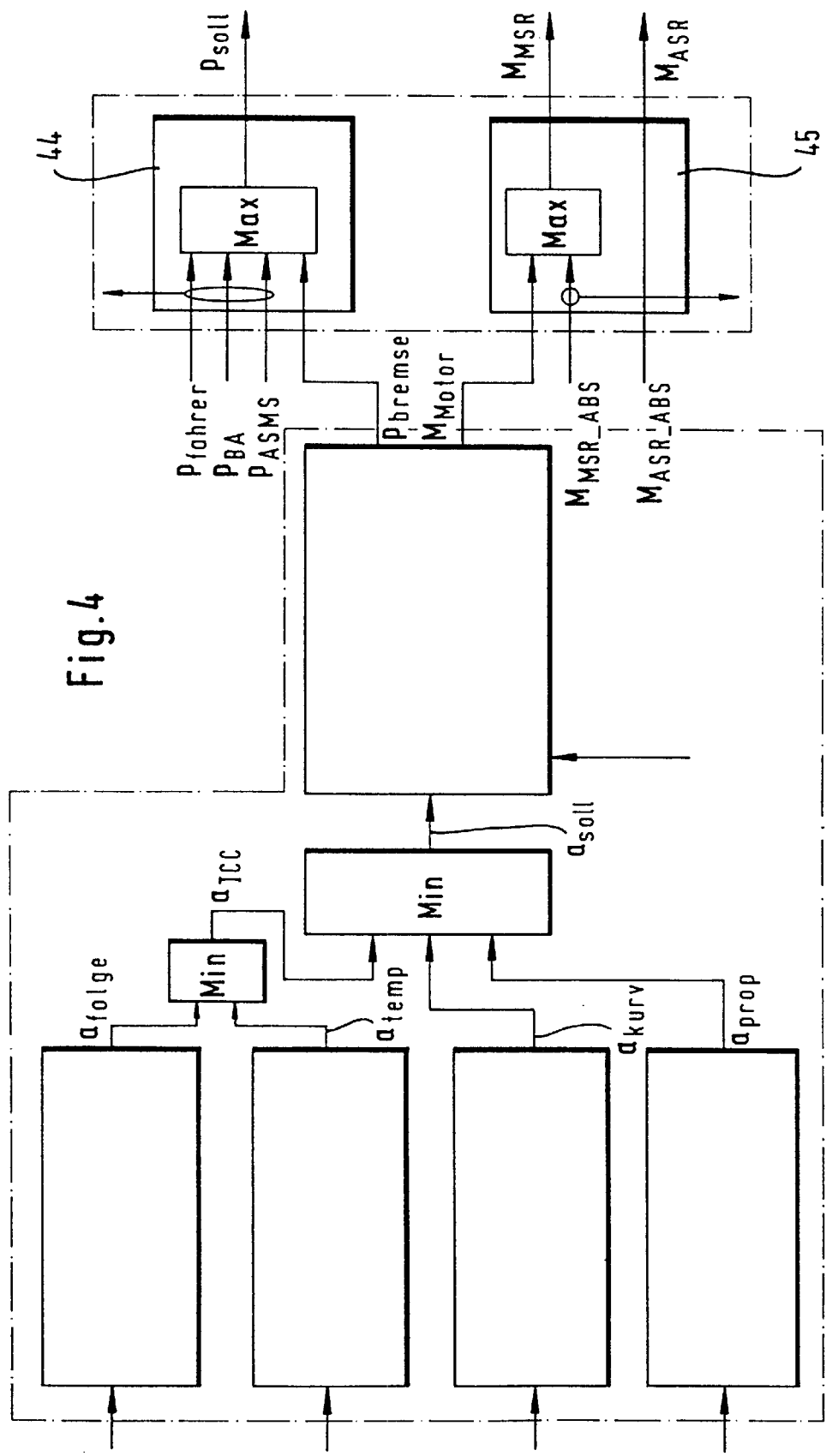
Figure 5:
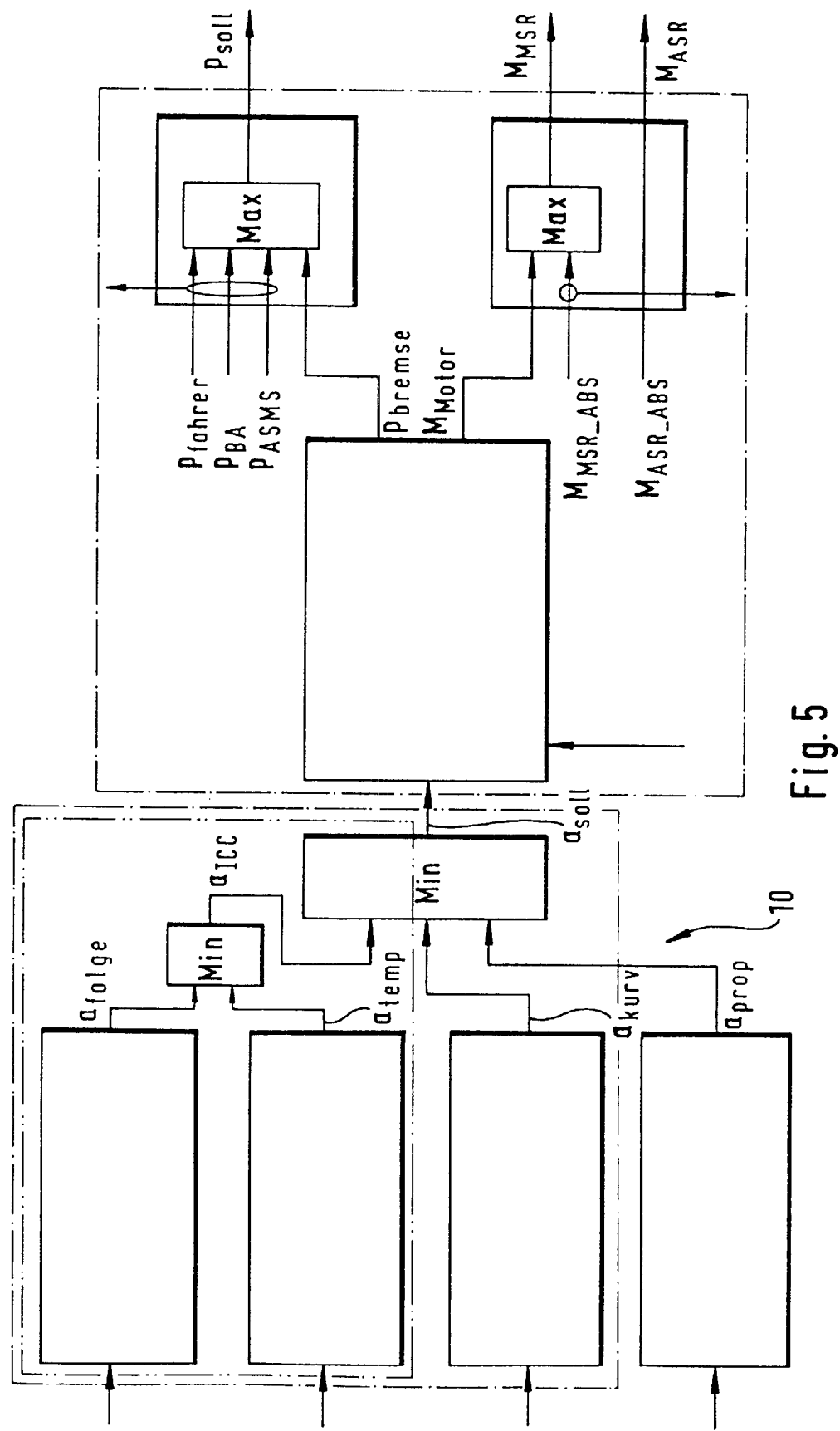

FIGS. 3 to 5 show individual functional assignments of the ICC control 10, the coordinators 14 and 15 and the control electronic units 16 and 17 for the brake and the engine.

In the embodiment of FIG. 3, the ICC control 10, the coordination device 34 for the brake and the coordination device 35 for the motor are separate functional blocks. This separation can be effected, for example, so that the individual objects are carried out by different processors, if necessary, different printed circuit boards, and also, if necessary, at different locations in the vehicle.

In the embodiment of FIG. 4, the two coordination devices 44 and 45 are integrated in one function or a functional block. This integration can be effected in the way that the function is performed, for example, by the same processor or at least on the same printed circuit board. When the coordination objectives are executed by the same processor, the advantage is that fewer serial interfaces have to be drafted and operated.

FIG. 5 shows an embodiment in which parts of the ICC control 10 form a function group, and the actual acceleration controller in conjunction with the coordinators form another function group. These function groups can be configured in the way that they are designed or realized by processors of their own, possibly on own printed circuit boards and, further, at different locations in the vehicle. Parts of the ICC control are integrated in a functional block so that the latter furnishes a nominal acceleration as an output which is picked up and further processed by the other functional block. The advantage of this embodiment is that the reactive effect to the required nominal acceleration can be performed in certain operating conditions in a simple fashion. Further advantages are achieved with respect to the number and the configuration of serial interfaces. The fact that the number of serial interfaces is reduced permits linking different signals more easily, for example, for plausibility checks, for reactions and transverse effects, and further polls.

What is claimed is:

1. Process of controlling the longitudinal dynamics of a vehicle, comprising the steps of:

determining a plurality of intermediate nominal pressure values generated by an Intelligent Cruise Control (ICC) control, a driver stability control and a driver demand;

determining a plurality of intermediate nominal torque values generated by the ICC control, an engine stall torque control, a Traction Slip Control (TCS) and a driver demand; and determining a nominal brake pressure and a nominal engine torque according to the plurality of intermediate nominal pressure values and the plurality of intermediate nominal torque values, respectively.

2. Process according to claim 1, wherein the nominal brake pressure is determined by selecting a maximum value of the intermediate nominal pressure values generated by the Intelligent Cruise Control (ICC) control, the driver stability control and the driver demand.

3. Process according to claim 1, wherein the nominal engine torque is determined by selecting a minimum value of the intermediate nominal torque value generated by the TCS and a maximum of the intermediate nominal torque values generated by the ICC control and the engine stall torque control.

4. Process according to claim 1, further including the step of producing an augmented braking specification when the intermediate nominal torque value generated by the engine stall torque control exceeds the intermediate nominal torque value generated by the ICC control.

5. Process according to claim 1, further including the step of controlling a brake system according to the nominal brake pressure.

6. Process according to claim 1, further including the step of controlling an engine according to the nominal engine torque.

7. Device for controlling the longitudinal dynamics of a vehicle, comprising:

an Intelligent Cruise Control (ICC) control for generating an intermediate nominal pressure value and an intermediate nominal torque value;

a first coordination device for determining a nominal brake pressure based on a plurality of intermediate nominal pressure values generated by the ICC control, a driver stability control and a driver demand; and a second coordination device for determining a nominal engine torque based a plurality of intermediate nominal torque values generated by the ICC control, an engine stall torque control, a Traction Slip Control (TCS) and a driver demand.

8. Device according to claim 7, wherein the first coordination device determines the nominal brake pressure by selecting a maximum value of the intermediate nominal pressure values generated by the Intelligent Cruise Control (ICC) control, the driver stability control and the driver demand.

9. Device according to claim 7, wherein the second coordination device determines the nominal engine torque by selecting a minimum value of the intermediate nominal torque value generated by the TCS and a maximum of the intermediate nominal torque values generated by the ICC control and the engine stall torque control.

10. Device according to claim 7, wherein an augmented braking specification is produced when the intermediate nominal torque value generated by the engine stall torque control exceeds the intermediate nominal torque value generated by the ICC control.

11. Device according to claim 7, further including a brake controller for controlling a brake system according to the nominal brake pressure.

12. Device according to claim 7, further including an engine controller for controlling an engine according to the nominal engine torque.

13. Device according to claim 7, wherein the first and second coordination devices are located in separate functional blocks of the vehicle.

14. Device according to claim 7, wherein the first and second coordination devices are integrated into a single functional block of the vehicle.

15. Device according to claim 7, wherein the ICC control and the first and second coordination devices are located in separate functional blocks of the vehicle.

* * * * *